United States Patent [19]

Jayant et al.

[11] 4,291,405
[45] Sep. 22, 1981

[54] ERROR REDUCTION SPEECH COMMUNICATION SYSTEM

[75] Inventors: Nuggehally S. Jayant, Short Hills; Carolyn E. Schmidt, Gillette; Raymond Steele, Hazlet, all of N.J.

[73] Assignee: Bell Telephone Laboratories, Incorporated, Murray Hill, N.J.

[21] Appl. No.: 73,207

[22] Filed: Sep. 7, 1979

[51] Int. Cl.³ .................. G06F 11/00; G08C 25/00
[52] U.S. Cl. ............................. 371/31; 179/1 SA; 375/34; 328/165
[58] Field of Search .............. 371/31, 6, 30; 375/34, 375/99; 179/1P, 1 SA; 328/135, 149, 165; 455/296

[56] References Cited

U.S. PATENT DOCUMENTS

| | | | |
|---|---|---|---|
| 3,386,079 | 5/1968 | Wiggins | 371/31 |
| 3,418,630 | 12/1968 | Van Duuren | 371/39 |
| 3,562,708 | 2/1971 | Verbarg et al. | 371/31 |
| 4,042,923 | 8/1977 | Merrick | 371/31 |
| 4,045,863 | 10/1977 | Goodman et al. | 371/31 |

Primary Examiner—Charles E. Atkinson
Attorney, Agent, or Firm—Jack S. Cubert

[57] ABSTRACT

An arrangement reduces transmission errors in a communication system that includes a transmitter operative to convert an input signal into blocks of coded signals and a receiver operative to convert the coded blocks into a replica of the input signal. In the transmitter, a signal representative of first features of the input signal and a signal corresponding to second features of the input signal are generated. In the receiver, corrupted received coded signals are detected responsive to the first feature signal and the received blocks of coded signals. Each corrupted received coded signal is modified jointly responsive to the received blocks of coded signals and the second feature signal to reduce errors in the input signal replica.

34 Claims, 6 Drawing Figures

ERROR REDUCTION SPEECH COMMUNICATION SYSTEM

BACKGROUND OF THE INVENTION

Technical Field

Our invention relates to digital communication systems and more particularly to arrangements for improving the quality of signals carried over a noise-prone digital channel.

Digital communication systems are adapted to carry any signal that can be coded in digital form. Data signals already in digital form must be converted to the format of the digital facility over which they are to be transmitted. Analog signals such as speech require sampling and encoding prior to application to the digital facility. In order to take advantage of the inherent wide bandwidth of digital channels, a plurality of coded signals are multiplexed. The multiplexed coded signals are transmitted over a common digital channel. Demultiplexing and decoding of the separated signals at receiving points of the digital facility completes the communication process. While digital encoding improves the signal to noise ratio of the signal transmission, noise introduced on the digital transmission channel may seriously affect the quality of transmission. Impulse type noise, in particular, can seriously modify the bit pattern of one or more digital codes so that the information decoded at the digital facility receiving point is incorrect or of reduced intelligibility.

Many schemes have been devised to overcome the effect of channel noise. In one such arrangement, the coded data signals are divided into blocks, and an algebraically related special code word is added to each block to permit correction of errors. Where such complex algebraic error coding is utilized, the protection code may comprise a set of binary parity checks over preassigned subsets of data bits. The parity checks may be utilized to both detect and correct errors in data bits of the block. Such error coding schemes are applicable to any type of data and to any data source. A parity coding error correcting scheme for audio digital recording, for example, is disclosed in U.S. Pat. No. 4,145,683 issued Mar. 20, 1979 to Marshall R. Brookhart. In the system described in the Brookhart patent, a digitized audio signal is partitioned into frames. Parity words and error check words are generated for each frame. The successive frames are recorded on a record medium. Individual errors are detected and corrected during playback of the frames responsive to the parity and error check words.

While correction of individual errors may be important in data transmission or high quality television or audio transmission, it is not necessary in speech signal transmission where only intelligibility and perceptual acceptability are needed. An error reducing device for improvement of rather than correction of a digitally transmitted signal is disclosed in U.S. Pat. No. 3,386,079 issued May 28, 1968 to M. J. Wiggins. The Wiggins arrangement is operative to transfer previously received information if, during a sampling period, more than one intelligence bearing pulse is detected. In this manner, a degree of noise immunity is obtained although there is no correction of errors due to noise.

U.S. Pat. No. 4,054,863 issued Oct. 18, 1977 to D. J. Goodman and R. Steele and assigned to the same assignee discloses an error detection and correction system in which a sequence of received signals is divided into blocks and each received block is partitioned into subblocks in a digital signal receiver. For each received block, a signal representative of the deviations of the coded signals of the block is generated along with a signal representative of the deviations among the signals of each subblock of the block. When the received subblock deviation signal exceeds the received block deviation signal, the subblock signals are altered to reduce the subblock deviations.

The Goodman et al arrangement is operative to detect abnormal deviations and to provide subgroup deviation reduction. It is apparent, however, that the Goodman arrangement does not correct signal errors but modifies subgroups if errors are thought to be present due to abnormal variations in received signal deviations. Thus, it is likely to modify error free subgroup signals whose deviations appear abnormal. Such "false alarm" error detection and incorrect modification of error free signals severely affects the quality of the signal replica produced by the digital signal receiver. It is an object of the invention to provide an improved error reduction arrangement for the transmission of signals over a digital communication facility.

BRIEF SUMMARY OF THE INVENTION

The invention is directed to an arrangement for reducing errors in signal transmitted over a digital channel in which a transmitter converts an input signal into a sequence of signal codes. The sequence of signal codes is partitioned into a plurality of blocks which blocks are applied to a transmission channel. A signal receiver connected to the transmission channel coverts the sequence of signal codes into a replica of the input signal. The transmitter further includes apparatus responsive to the coded signal blocks for generating a signal representative of a first set of features of the input signal and a signal corresponding to a second set of features of the input signal. The signal receiver further includes apparatus jointly responsive to the received first feature signal and the received signal codes of the blocks for detecting corrupted signal codes, and apparatus for modifying the corrupted signal codes jointly responsive to the received second feature signal and the received coded signals of the blocks.

According to one aspect of the invention, the coded signals of each block are combined to form a signal representative of a first distinct feature of the block portion of the input signal and a signal corresponding to a second distinct feature of the input signal block portion.

According to another aspect of the invention the apparatus in the receiver for detecting corrupted signal codes includes apparatus jointly responsive to each received block and the received first distinct feature signal of the block portion for detecting the occurrence of each corrupted received coded signal of the block and the receiver modifying apparatus includes apparatus jointly responsive to the coded signals of the received block and the second distinct feature signal of the received block for altering each detected corrupted signal.

According to yet another aspect of the invention, the first feature signal is representative of the maximum deviation between adjacent signal codes of each block and the second feature signal corresponds to a representative deviation of the block signal codes. At the receiver, the difference between each pair of adjacent signal codes in the block is compared to the received maximum deviation signal of the block to detect corrupted signal codes. Corrupted signals are corrected by modifying the detected corrupted signal jointly responsive to the received representative deviation signal and the block received signal codes.

DETAILED DESCRIPTION

Figure 1:
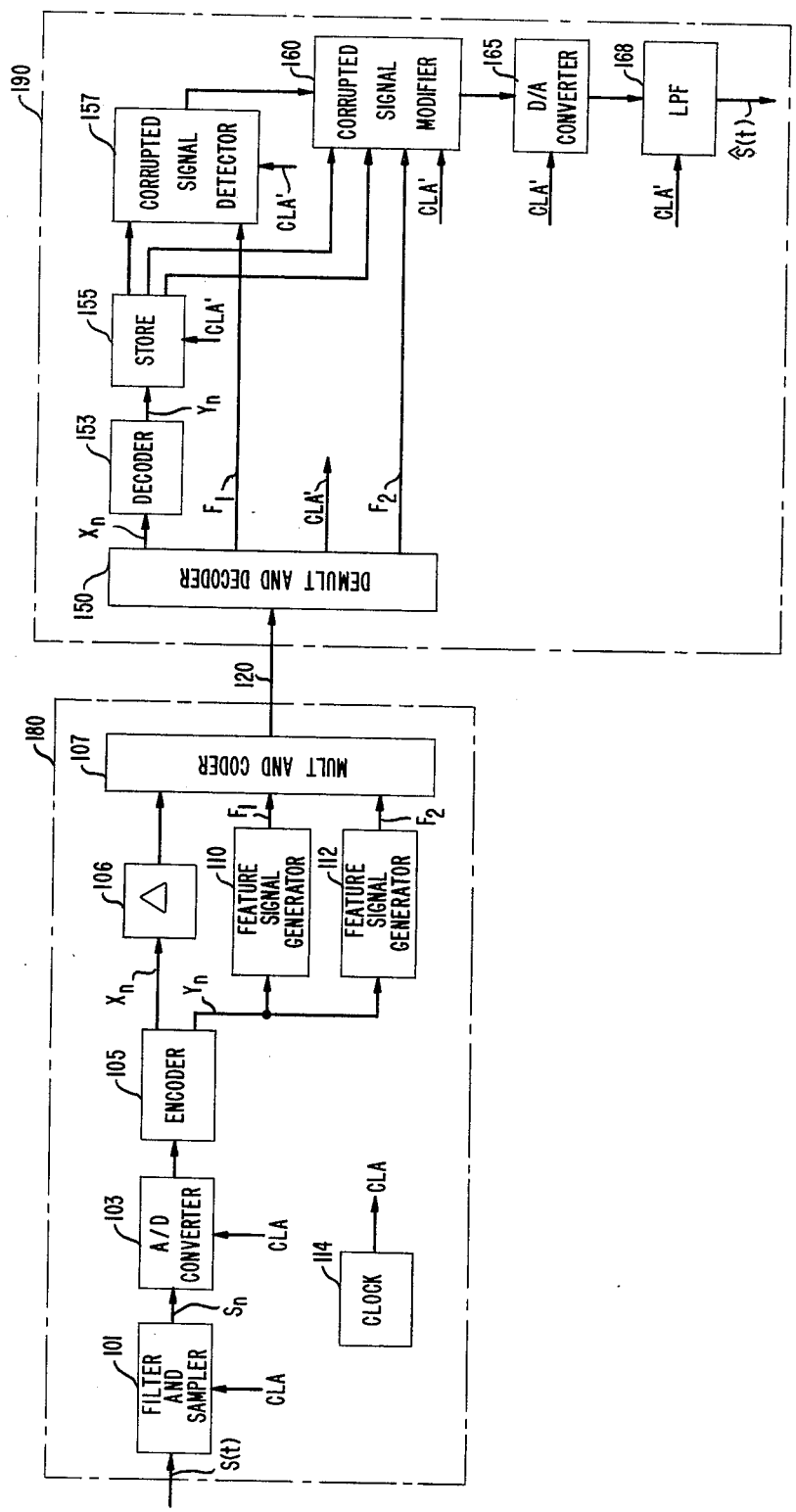
FIG. 1 depicts a general block diagram of a digital speech communication system illustrative of the invention.

FIG. 1 shows a general block diagram of a digital communication system incorporating an error reduction arrangement illustrative of the invention. Referring to FIG. 1, a speech signal s(t) is applied to filter and sampler circuit 101 of transmitter 180. The filter and sampler circuit is operative to remove higher frequency components of signal s(t) and to sample the filtered signal at a rate determined by pulses CLA from clock circuit 114. The sampling rate, for example, may be 8 kHz and the cutoff frequency of the low-pass filter may be set at 4 kHz as is well known in the art.

The sampled signal $S_n$ from circuit 101 is supplied to analog-to-digital converter 103 in which a digital code corresponding to the magnitude of each sampled signal is generated. The digital codes from A to D converter 103 are quantized and encoded by encoder 105 into a digital format acceptable to the digital transmission facility. Encoder 105 also provides output coded signals $y_n$ which coded signals correspond to the decoded $x_n$ samples obtained from encoder 105. The $y_n$ samples are supplied to feature signal generator 110 and feature signal generator 112.

Generator 110 receives a predetermined block of successive coded signals $y_n$ and responsive to the block coded signals forms a signal $F_1$ corresponding to a statistical or acoustic feature of the block of coded signals $y_n$. Generator 112 also receives the block of coded signals and responsive thereto forms a second signal $F_2$ corresponding to a second acoustic or statistical feature of the block coded signals.

Multiplexor and coder 107 is operative to combine the signals $x_n$ from encoder circuit 105 and signals $F_1$ and $F_2$ from feature signal generators 110 and 112 and to encode the combined signals for transmission over channel 120. Since feature signals $F_1$ and $F_2$ are used in the receiver to reduce errors in the transmitted signal codes $x_n$, each block of N signal codes from multiplexor and coder circuit 107 is arranged in the sequence $F_1$, $F_2$, $x_1$, $x_2$, ... $x_N$. The signals $x_n$ are delayed for one block period by delay circuit 106 so that feature signals $F_1$ and $F_2$ precede the transmitted coded signals of the block.

In this way, any corruption caused by noise on channel 120 can be detected responsive to feature signal $F_1$ and the corrupted signal portion can be corrected responsive to feature signal $F_2$ in receiver 190.

Feature signal $F_1$ may be selected to correspond to the maximum range of the coded signal of its block and feature signal $F_2$ may be selected to be representative of the average difference between the coded signal of its block. Corruption of a coded signal of the block by impulsive noise on channel 120 is then readily detectable by a comparison of each coded signal with feature signal $F_1$. Reduction of the error in the corrupted coded signal is readily obtained through modification of the corrupted coded signal responsive to feature signal $F_2$ and the coded signals adjacent to the corrupted coded signal.

Receiver 190 is operative to decode the coded signal of each successively applied block and to modify the coded signals to reduce errors therein induced by noise on channel 120. Demultiplexor and decoder 150 in receiver 190 is operative to separate received feature signals $F_1$ and $F_2$ from the received coded signals $X_n$. Received feature signal $F_1$ is applied to corrupted signal detector 157 for the duration of the block and received feature signal $F_2$ is applied to corrupted signal modifier 160 for the duration of the block.

Decoder 153 is operative to convert received coded signal $X_n$ which may be in pulse code modulated or other specialized coded form into coded signal $Y_n$. Coded signal $Y_n$ is a binary numerical version of the nth received coded signal sample. The coded signal $Y_n$ and neighboring coded signals are temporarily stored in store 155. Corrupted signals are detected in detector 157 jointly responsive to received feature signal $F_1$ from demultiplexor 150 and the stored coded signals $Y_n$ from store 155. Upon detection of a corrupted signal $Y_n$, signal modifier 160 is enabled to modify the corrupted signal jointly responsive to the stored signal codes from store 155 and the received second feature signal $F_2$ from demultiplexor 150. All coded signals from store 155 which are determined to be uncorrupted in detector 157 pass through signal modifier 160 without change.

The output of signal modifier 160 represents the reduced error coded signals of the block which reduced error coded signals are converted to analog samples in digital-to-analog converter circuit 165. The analog samples are low-pass filtered in filter circuit 168, and the output therefrom is a replica of the speech signal originally applied to the transmitter. While the signal replica is not error free, it exhibits an improved correspondence to the transmitter input signal whereby it is perceptually acceptable.

Figure 2:
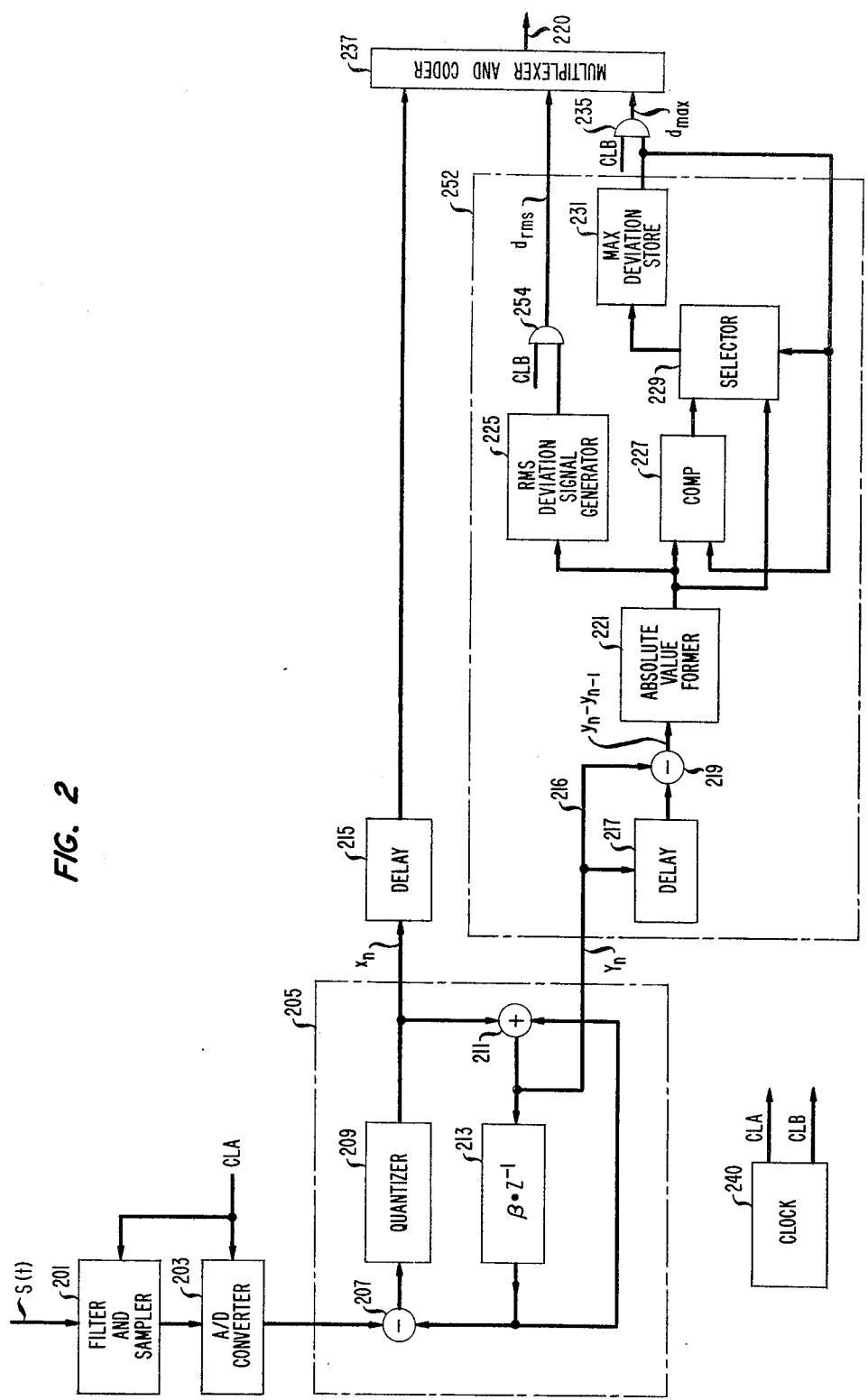
FIG. 2 depicts a detailed block diagram of a diffrential pulse code modulation transmitter illustrative of the invention.
Figure 3:
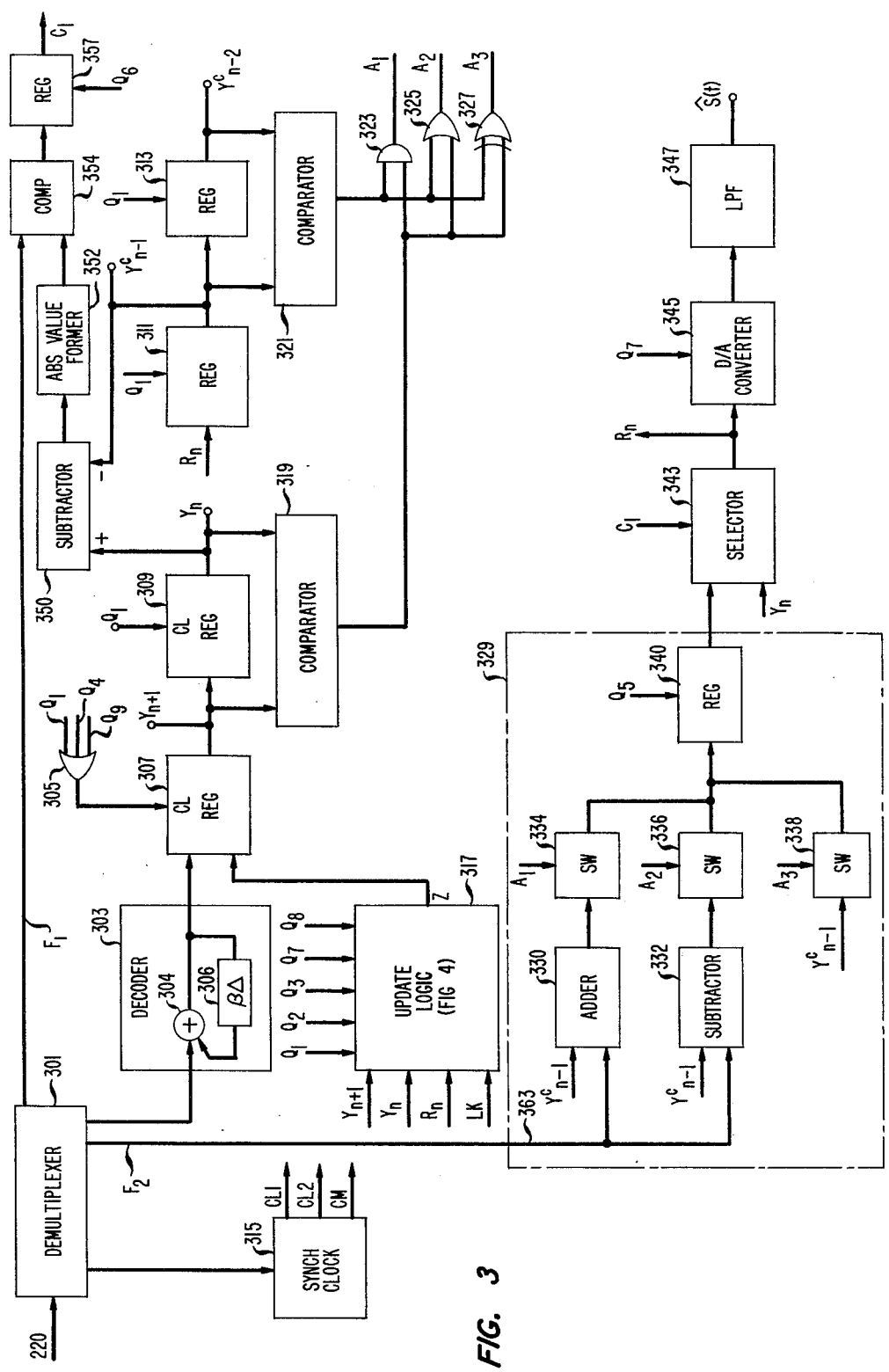
FIG. 3 depicts a detailed block diagram of a differential pulse code modulation receiver illustrative of the invention.
Figure 4:
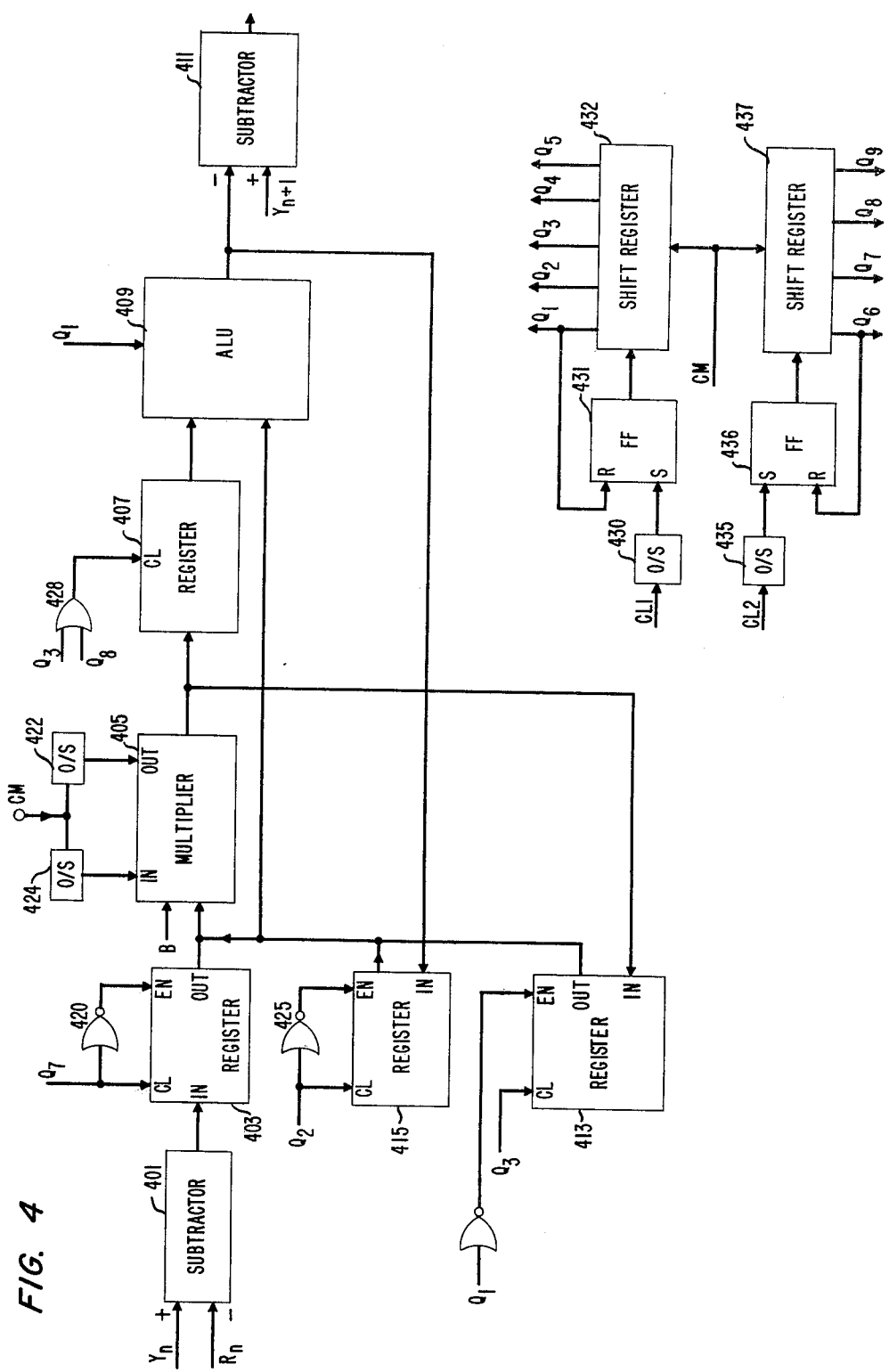
FIG. 4 depicts a detailed block diagram of an update logic circuit and a clock arrangement useful in the differential pulse code modulation receiver of FIG. 3.

The circuit of FIG. 1 may be implemented in many types of digital speech communication arrangements. FIGS. 2, 3 and 4 illustrate a differential pulse code modulation (DPCM) system in which the error reduction scheme of the invention is incorporated. FIG. 2 shows a DPCM transmitter operative to generate a block partitioned sequence of DPCM coded signals responsive to an input signal S(t). Each block contains a set of coded signals $x_1$, $x_2$, ..., $x_N$, a first feature signal $F_1$ representative of maximum deviation between adjacent samples of the block to be transmitted, and a second feature signal $F_2$ corresponding to the RMS value of the deviations among the signal samples of the block to be transmitted. As aforementioned with respect to FIG. 1, the first feature signal $F_1$ permits detection of signals corrupted by noise on the digital transmission channel and the second feature signal $F_2$ allows modification of detected corrupted signals in accordance with the characteristics of the signal being transmitted. Statistical, acoustic, or other characteristics of the input signal may be utilized for feature signals $F_1$ and $F_2$.

Referring to FIG. 2, signal S(t) is applied to filter and sampling circuit 201 which band limits the signal and provides sampled outputs $s_n$ at a rate determined by clock pulses CLA from clock pulse generator 240. Circuit 201 may be arranged to band limit signal S(t) to 4 kHz and to sample the band limited signal at an 8 kHz rate. The signal samples from circuit 201 are supplied to A to D converter 203 which is operative to convert each signal sample to a binary coded signal $s_n$. The sequence of $s_n$ signals are applied to the input of differential pulse code modulation encoder 205.

As is well known in the art, encoder 205 provides a series of difference signals $x_n$ responsive to the $s_n$ sequence from converter 203. In coder 205, subtractor 207 removes the predicted component of each signal sample $s_n$ and supplies the resulting unpredicted component to quantizer 209. In quantizer 209, the difference output of subtractor 207 is selectively converted into one of a plurality of predetermined levels for transmission. The quantized difference signal $x_n$ is then supplied to multiplexor and coder 237 via one block delay 215. The output of quantizer 209 is also applied to Adder 211 together with the previously predicted components from predictor circuit 213. The output of Adder 211 is then supplied to predictor 213 and is also applied to feature signal former 252 as signal sequence $y_n$. Sequence $y_n$ represents the reconstructed quantized samples of the input signal corresponding to the quantized sequence $x_n$.

Feature signal former 252 is adapted to provide feature signal $F_1$ and feature signal $F_2$ for each block of N coded signals $x_1, x_2, \ldots, x_n$. Feature signal $F_1$ corresponds to $$F_1 = \text{MAX}[y_n - y_{n-1}] \text{ for } n = 2, 3, \ldots, N \tag{1}$$

while feature signal $F_2$ corresponds to $$F_2 = \left[ \frac{1}{n-1} \sum_{n=2}^{N} (Y_n - Y_{n-1})^2 \right]^{\frac{1}{2}} \tag{2}$$

$$\text{for } n = 2, 3, \ldots, N$$

As readily seen from equation 1, signal $F_1$ corresponds to the maximum of the differences between the pairs of adjacent signals $y_n$ and $y_{n-1}$ in each block of N signals while signal $F_2$ corresponds to the RMS value of the adjacent signal differences of the block.

Each signal $y_n$ from encoder 205 is applied directly to the positive input of subtractor 219 and is also applied via one signal delay 217 to the negative input of subtractor 219. Thus, the output of subtractor 219 is a signal representative of $y_n - y_{n-1}$ which corresponds to the deviation of adjacent signals $y_n$ and $y_{n-1}$. Absolute value former 221 is operative to remove the sign of the deviation signal at the output of subtractor 219 as is well known in the art.

At the beginning of each block, maximum deviation store 231 is reset to zero. During the block signal processing, the output of maximum deviation store 231 is supplied to one input of comparator 227. The other input of comparator 227 receives the present deviation signal $y_n - y_{n-1}$ from absolute value former 221. Whenever the deviation signal from former 221 is greater than the signal in store 231, comparator 227 enables selector 229 to transfer the deviation signal from absolute value former 221 to maximum deviation store 231. Otherwise, the signal in store 231 remains unchanged. In this manner, store 231 contains the maximum deviation signal in accordance with equation 1 at the end of the block.

The output of absolute value former 221 is applied to RMS deviation signal generator 225 wherein the feature signal $F_2$ is produced in accordance with equation 2. Thus at the end of the N $x_n$ coded signals, the maximum deviation signal $F_1$ is available at the output of store 231 and the RMS deviation signal $F_2$ is available at the output of signal generator 225.

Responsive to clock pulse CLB occurring at the end of each block, gates 254 and 234 apply feature signals $F_1$ and $F_2$ to multiplexor and coder 237. Delay 215 provides a one block delay for each coded signal $x_n$. Thus, the feature signals $F_1$ and $F_2$ precede the sequence of N $x_n$ signal codes associated therewith. The order of the signals applied to channel 220 from multiplexor and coder 237 is $F_1, F_2, x_1, x_2, \ldots, x_N$. Feature signals $F_1$, $F_2$ may be specially coded to insure noise immunity on channel 220 e.g. by interleaving or repetition as is well known in the art.

A differential pulse code modulation receiver illustrative of the invention and adapted to operate with the transmitter circuit of FIG. 2 is shown in FIGS. 3 and 4. The block signals $F_1, F_2, X_1, X_2, \ldots X_N$ received from communication channel 220 are applied to demultiplexor 301. In demultiplexor 301, received feature signals $F_1$ and $F_2$ are separated from the sequence of received DPCM coded signals $X_1, X_2, \ldots, X_N$. The received DPCM coded signals are converted into binary coded signals in DPCM decoder 303 as is well known in the art.

Decoder 303 includes summing circuit 304 and predictor circuit 306. Responsive to the sequence of DPCM signals and the predicted value of the previously received DPCM signals, the sequence of coded sample signals $Y_1, Y_2, \ldots, Y_N$ is formed in decoder 303 and is applied to register 307. Registers 307, 309, 311, and 313 store signals $Y_{n+1}, Y_n, Y_{n-1}^c$ and $Y_{n-2}^c$ respectively. $Y_{n-1}^c$ and $Y_{n-2}^c$ are previously received and modified signals while $Y_{n+1}$ and $Y_n$ are received signals prior to modification.

In accordance with the invention, the signal $$Y_n - Y_{n-1}^c \tag{3}$$

is formed in subtractor 350 and absolute value former 352 and compared with the maximum deviation signal $F_1$ in comparator 354. If $$|Y_n - Y_{n-1}^c| > F_1 \tag{4}$$

received signal $Y_n$ is deemed corrupted and not the same as signal $y_n$ in the transmitter of FIG. 2. Signal $Y_n$ is then modified to reduce the error induced on transmission channel 220. In the presence of a detected corrupted signal $Y_n$, the receiver of FIG. 3 is operative to replace the corrupted signal $Y_n$ by $$Y_n^c = Y_{n-1}^c + \Delta_n \tag{5}$$

where $\Delta_n$ is $$F_2 \cdot \text{sgn}(Y_{n-1}^c - Y_{n-2}^c) \tag{6}$$

if
$$\text{sgn }(Y_{n-1}{}^c - Y_{n-2}{}^c) = \text{sgn }(Y_{n+1} - Y_n) \quad (7)$$

If, however,
$$\text{sgn }(Y_{n-1}{}^c - Y_{n-2}{}^c) \neq \text{sgn }(Y_{n+1} - Y_3) \quad (8)$$

then $\Delta_n = 0$.

$Y_{n+1}$, $Y_n$, $Y_{n-1}{}^c$, and $Y_{n-2}{}^c$ are successive outputs of decoder 303. $Y_{n-1}{}^c$ and $Y_{n-2}{}^c$ have been previously processed to correct any corruption thereof.

Because the correction process in FIG. 3 does not modify the operation of decoder 303, it is also necessary to update each later occurring signals $Y_{n+r}$ from decoder 303 to compensate for the modification of preceding corrupted signals. Thus each signal $Y_{n+r}$ must be corrected in accordance with $$Y_{n+r} + (\text{DIF}_n) \cdot \beta^r \quad (9)$$

where $\text{DIF}_n \triangleq Y_n{}^c - Y_n$ is the difference between the corrected and corrupted nth signal and $\beta$ is a leakage factor. The resultant sequence of corrected coded signals $Y_1{}^c$, $Y_2{}^c$, ... $Y_n{}^c$ provides a sampled replica of the transmitter input signal that is partially corrected for noise occurring on transmission channel 220. While the replica does not correspond exactly to the input signal, it is a considerable improvement over the corrupted sequence and it is perceptually acceptable.

Figure 6:
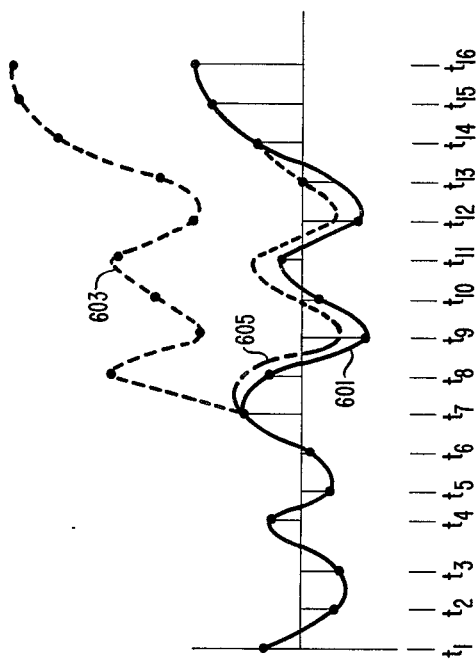
FIG. 6 shows waveforms illustrating the corrupted signal modification obtained with the use of the receiver circuit of FIG. 3.

For purposes of illustration, the operation of the receiver circuit of FIG. 3 is described with respect to a particular input signal shown in waveform 601 in FIG. 6. Waveform 603 shows a replica of the signal of waveform 601 after corruption on a noise prone channel. Waveform 605 illustrates the signal replica after modification in the circuit of FIGS. 3 and 4. Table 1 lists the sequence of signal samples prior to transmission in column "$Y_n$" the sequence of corrupted signal samples in column "$Y_n$" the sequence of predictor corrected signal samples in column "$Y_n'$" and the sequence of modified signal samples in column "$R_n = Y_n{}^c$".

TABLE I

| | | signal period | | | |
|---|---|---|---|---|---|
| m | n | $y_n$ | $Y_n$ | $Y_n'$ | $R_n = Y_n{}^c$ |
| 0 | 1 | 1 | 3 | 3 | 3 |
| 1 | 2 | −4 | −4 | −4 | 4 |
| 2 | 3 | −4 | −4 | −4 | −4 |
| 3 | 4 | 3 | 3 | 3 | 3 |
| 4 | 5 | −3 | −3 | −3 | −3 |
| 5 | 6 | −1 | −1 | −1 | −1 |
| 6 | 7 | 6 | 6 | 6 | 6 |
| 7 | 8 | 3 | 20 | 6 | 6 |
| 8 | 9 | −7 | 10 | −4 | −4 |
| 9 | 10 | −2 | 15 | 1 | 1 |
| 10 | 11 | 2 | 19 | −5 | 5 |
| 11 | 12 | −6 | 11 | −3 | −3 |
| 12 | 13 | −3 | 14 | 0 | 0 |
| 13 | 14 | 6 | 25 | 15, 10 | 6 |
| 14 | 15 | 10 | 29 | 10 | 10 |
| 15 | 16 | 11 | 30 | 11 | 11 |

The quantized output of Adder 211 in DPCM encoder 205 corresponding to waveform 601 is shown in the $y_n$ column of table 1. As previously described with respect to FIG. 2, the $y_n$ values in table 1 are utilized to generate feature signals $F_1$ and $F_2$. For the block of 16 coded signals in the $y_n$ row of table 1, feature signal $F_1$ is 10 corresponding to the difference between $y_9$ and $y_8$ in accordance with equation 1. The feature signal $F_2$ produced in signal generator 225 for the 16 coded signal block is 6 in accordance with equation 2. It is assumed that impulsive noise occurs during the transmission of the signal block for waveform 601 and that the noise corrupts coded signal $x_8$ and coded signal $x_{14}$. The corruption of these two signals make the $Y_8$ output of decoder 303 equal to 20 rather than 3 and also makes the value of $Y_{14}$ from decoder 303 equal to 25 rather than 6. The output of decoder 303 for the 16 coded signal block is shown in waveform 603 and the $Y_n$ values for waveform 603 are listed in the $Y_n$ column of table 1. As readily seen in FIG. 6, corrupted waveform 603 is substantially different than original waveform 601.

The sequence of operations of the receiver circuit shown in FIGS. 3 and 4 is controlled by synchronizing clock 315. Clock 315 receives a sequence of synchronizing signals derived from the coded signal train in demultiplexor 301. Any of the well known synchronizing arrangements for digital communication systems may be used. One such arrangement is described in the article "A Digital Subband Coder for Speech Communication at 9.6 kbs" by A. J. Presti, J. D. Johnston, R. E. Crochiere and D. J. Goodman appearing in *The International Conference on Communications ICC '77 Conference Record* pgs. 193–197.

Figure 5:
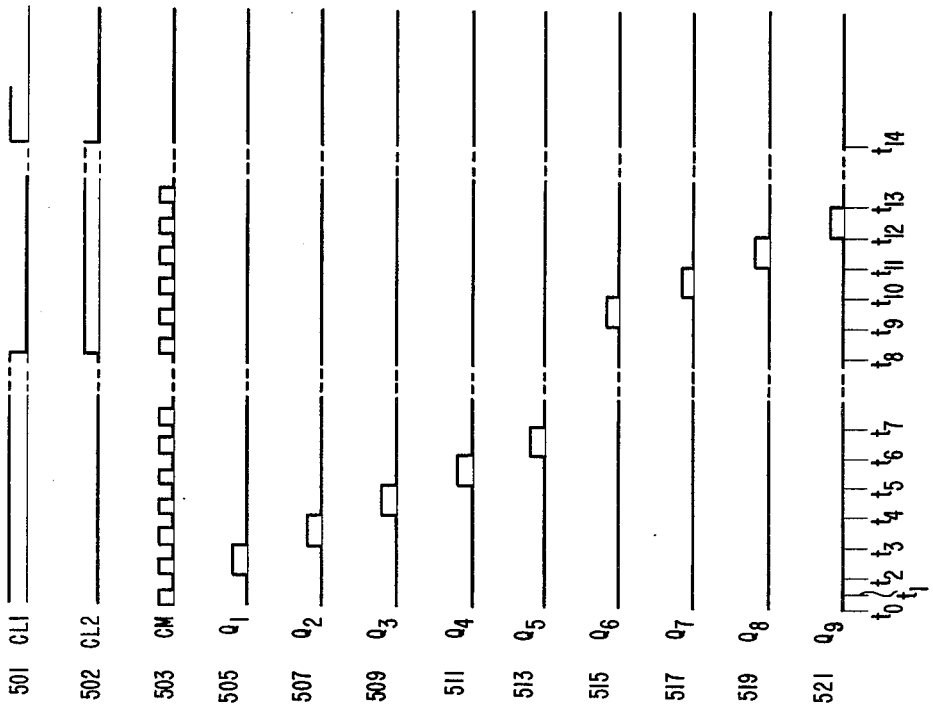
FIG. 5 shows waveforms useful in illustrating the operation of the receiver circuit of FIG. 3.

Upon receipt of each coded signal $X_n$, synchronizing clock 315 produces clock signal CL1 and clock signal CL2. These clock signals are illustrated in waveforms 501 and 502 of FIG. 5. As shown in FIG. 5, clock pulse CL1 goes high at time $t_0$ and remains high until time $t_8$. Clock pulse CL1 goes low at time $t_8$, when clock pulse CL2 goes high. Clock pulse CL2 remains high until time $t_{14}$ at which time the next coded signal in demultiplexor 301 causes another CL1 clock pulse to appear.

Free running clock pulses CM shown in waveform 503 are also produced by clock 315. One shot pulse generator 430 in FIG. 4 is triggered by the positive going edge of clock pulse CL1 at time $t_0$. The output of generator 430 sets flip-flop 431 which in turn causes a pulse to be inserted into multistage shift register 432. The newly inserted pulse in register 432 is shifted responsive to each positive going edge of clock pulse CM so that control pulse Q1 is generated at time $t_2$. The positive edge of pulse Q1 is operative to reset flip-flop 431. As shown in waveforms 505, 507, 509, 511 and 513, control pulses Q1 through Q5 are successively produced in shift register 432.

Upon the occurrence of the CL2 clock pulse at time $t_8$, one shot pulse generator 435 is triggered and a pulse is inserted into multistage shift register 437 via flip-flop 436. At the next positive going edge of clock pulses CM, a Q6 control pulse is produced and flip-flop 436 is reset. Between times $t_9$ and $t_{13}$, clock pulses Q6, Q7, Q8 and Q9 shown in waveforms 515, 517, 519, and 521 are successively produced by shift register 437. The $Q_1$ through $Q_9$ control pulses are used to time the operations of the receiver circuit of FIGS. 3 and 4 during the processing of each incoming coded signal.

Assume for purposes of illustration that each of storage registers 307, 309, 311, and 313 is initially set to zero prior to reception of the block of $Y_n$ signals listed in the first row of table 1. Feature signal $F_1 = 10$ is first received by demultiplexor 301. This feature signal is applied to comparator 354 for the duration of the 16 coded signal block. Feature signal $F_2 = 6$ is then received and is applied to line 363 for the remainder of the block. The first signal appearing at the output of decoder 303 for the 16 coded signal block is $Y_1 = 3$. Responsive to control pulse $Q_1$, OR-gate 305 is enabled and the $Y_1 = 3$ signal is inserted into register 307. At this time, the zero previously in register 307 is transferred to register 309. A zero signal from selector 343 is inserted into register 311 and the zero signal from register 311 is inserted in register 313.

The $Y_{n+1}$, $Y_n$, $Y_{n-1}^c$, and $Y_{n-2}^c$ outputs of registers 307, 309, 311, and 313 are utilized to detect corruption of signal $Y_n$ and to provide modification of any corrupted $Y_n$ signal to reduce error. To detect whether the signal $Y_n$ from register 309 has been corrupted by noise, the output of register 309 is applied to the positive input of subtractor 350 and the output of register 311 is applied to the negative input thereof. Subtractor 350 is effective to form the difference between adjacent signals $Y_n$ and $Y_{n-1}^c$. The absolute value of this difference signal is formed in absolute value former circuit 352. The output of circuit 352 is compared with feature signal $F_1$ in comparator 354. In the event that the output of absolute value former circuit 352 is greater than the $F_1$ feature signal as in equation 4, an enabling signal is produced by comparator 354. The enabling signal sets register 351 responsive to the $Q_6$ control pulse from shift register 437. Thus, when a corrupted signal is so detected, signal $C_1$ from register 357 is enabled.

When the first block signal of the block, $Y_1 = 3$, is in register 307 and each of registers 309, 311 and 313 contains a zero code, comparator 354 is not enabled and signal $C_1$ remains disabled for the entire first (m=0) signal period. Responsive to disabled signal $C_1$, selector 343 is operative to connect the $Y_0 = 0$ input thereto to its output so that signal $R_0 = 0$ from the selector is equal to signal $Y_0$ from register 309.

The $Y_1 = 3$ signal remains in register 307 until control signal $Q_1$ of the next signal period (m=1) is enabled. Responsive to the $Q_1$ control signal of the m=1 signal period, the $Y_2 = -4$ signal from decoder 303 is placed in register 307 while the $Y_1 = 3$ signal is transferred from register 307 to register 309. Register 311 receives the $R_0 = 0$ signal from register 309 via selector 343 and register 313 receives the zero signal from register 311. The $Y_1 = 3$ signal in register 309 less the zero signal in register 311 is smaller than feature signal $F_1 = 10$. Signal $C_1$ is not enabled in the $Q_6$ time interval, and the $Y_1 = 3$ signal from register 309 passes through selector 343.

After the termination of the $Q_1$ control signal of the m=2 signal period, register 307 contains a $Y_3 = -4$ signal, register 309 contains a $Y_2 = -4$ signal, register 311 contains a $Y_1^c = 3$ signal, and register 313 contains a zero signal. In the m=2 signal period during which signal $Y_2$ is inspected for corruption, $Y_2 - Y_1^c = 7$. Since $F_1 = 10$, control signal $C_1$ is not enabled. The $Y_2 = -4$ signal from register 309 is made available as the $R_2$ signal at the input of register 311 and at the input of D to A converter 345. Consequently the signals in register 307, 309, 311, and 313 are shifted right one position and the $Y_4 = 3$ signal is inserted into register 307 from decoder 303 at the beginning of the m=3 signal period.

Until the m=8 signal period, there is no correction of $Y_n$ signals, and the $R_n$ signals of table 1 remain the same as the $Y_n$ signals in the table. The first corrupted coded signal, $Y_8 = 20$, is inserted into register 309 by the $Q_1$ control signal in the m=8 signal period. Upon termination of the $Q_1$ control signal in the m=8 signal period, register 307 contains the $Y_9 = 10$ signal. Register 309 contains the $Y_8 = 20$ signal. Register 311 contains the $Y_7^c = 6$ signal, and register 313 contains the $Y_6^c = -1$ signal. Since $Y_8 - Y_7^c$ is greater than feature signal $F_1 = 10$, the output of comparator 354 is enabling and register 357 is set by the $Q_6$ control signal. Signal $C_1$ is turned on which signal indicates a corrupted coded signal $Y_8$ has been detected.

In the interval between control signals $Q_1$ and $Q_6$ of each signal period, comparator 319 is operative to compare the $Y_{n+1}$ output of register 307 with the $Y_n$ output of register 309. The output of Comparator 319 is enabled only if signal $Y_{n+1}$ is greater than signal $Y_n$. Similarly, comparator 321 provides an enabled output in the event that the $Y_{n-1}^c$ signal of register 311 is greater than the $Y_{n-2}^c$ output of register 313.

During the m=9 signal period, $Y_9 < Y_8$ and $Y_7 > Y_6$ in the interval between the $Q_1$ and $Q_6$ control signals. The output of comparator 319 is disabling while the output of comparator 321 is enabling. Responsive to the outputs of comparators 319 and 321 at this time, signal $A_1$ from AND-gate 323 is disabling and signal $A_2$ from NOR-gate 325 is disabling. But, signal $A_3$ from exclusive OR-gate 327 is enabling. Signal $A_3$ causes switch 338 to close so that the signal immediately preceding the corrupted coded signal $Y_8(Y_7^c = 6)$ is placed in register 340 responsive to control signal $Q_6$ at time $t_6$ during the n=8 signal period.

At time $t_6$ of the m=8 signal period, register 340 contains the $Y_7^c = 6$ signal. Signal $C_1$ from register 357 is enabled during the $Q_6$ control signal, and the $Y_7^c = 6$ in register 340 appears at the output of selector 343. In accordance with equations 5 and 8, signal $R_8$ equals 6 rather than the corrupted value 20. As is readily seen from FIG. 6, the modified signal of waveform 605 at time $t_8(R_8 = 6)$ is much closer to the input waveform 601 than the corrupted signal $Y_8$ shown in waveform 603. Consequently, there is a significant error reduction in the presence of a noisy transmission channel.

Owing to the differential pulse code modulation arrangement of FIGS. 2, 3, and 4, the error in the $Y_8$ decoded signal remains in predictor 306 and continues to appear in the predictor output of decoder 303 as indicated in waveform 603. This predictor error is removed from the succeeding outputs of decoder 303 by update logic 317 shown in detail in FIG. 4.

Prior to the detection of the corrupted signal $Y_8$, registers 403, 407, 413, and 415 of FIG. 4 remain set at zero. Subtractor 401 is operative to apply the detected error signal $(Y_n - R_n)$ to register 403 responsive to the $Q_7$ control signal in the nth signal period. During the $Q_7$ control signal interval, the $Y_n$ input of subtractor 401 corresponds to the contents of register 309 and the $R_n$ input to subtractor 401 corresponds to the corrected signal $R_n$ from selector 343. The difference between these two signals is the predictor error correction factor which must be subtracted from succeeding outputs of decoder 303.

In the $Q_7$ interval of the m=8 signal period, the error signal at the input of subtractor 401 is $Y_8 - R_8 = 14$. This error correction signal is placed in register 403 and is applied therefrom to one input of multiplier 405. A constant signal $\beta$ corresponding to the leakage factor in the DPCM coder predictor is applied to the other input to multiplier 405. The constant $\beta$ is generally of the order of 0.9 to 0.99. For purposes of simplification, the factor $\beta$ is assumed to be unity.

Multiplier 405 is responsive to a CM pulse applied via one-shot circuits 422 and 424 to produce an output during each control pulse period. Therefore, register 407 receives the 14$\beta$ output of multiplier 405 at the beginning of the $Q_8$ control pulse period. At this time, arithmetic logic unit 409 is set to transfer the contents of register 407 (14$\beta$) to the negative input of subtractor 411. The other input of subtractor 411 receives the $Y_{n+1}=Y_9=10$ signal from register 307. After the difference signal ($-4$) appears at the output of subtractor 411, register 307 is enabled by the $Q_9$ control pulse from shift register 437 and the prediction corrected signal $Y_9'=-4$ is inserted into register 307.

At the beginning of the $m=9$ signal period, register 307 controls the $Y_9'=-4$ signal. Register 309 contains the $Y_8=6$ signal, register 311 contains the $Y_7{}^c=6$ signal, and register 313 contains the $Y_6{}^c=-1$ signal. Responsive to the $Q_1$ control pulse in the $m=9$ signal period, register 313 receives the $Y_7{}^c=6$ signal from register 311. Register 311 receives the $R_8=6$ signal from register 340 via selector 343. Register 309 receives the $Y_9'=-4$ signal from register 307 and register 307 receives the $Y_{10}=15$ signal from the output of decoder 303.

During the $Q_1$ control signal interval of the $m=9$ signal period, the output of register 413 (0) is applied to one input of arithmetic logic unit 409 responsive to the $Q_1$ control pulse applied via NOR-gate 426. Arithmetic logic unit 409 is responsive to the $Q_1$ control pulse to form the sum of the contents of register 407 ($14\beta$) and the contents of register 413, (0). The resultant sum, ($14\beta$), is inserted into register 415 responsive to the $Q_2$ control pulse. The contents of register 415 ($14\beta$) is applied therefrom to multiplier 405 in the $Q_2$ control pulse interval and the product $14\beta^2$ is inserted into registers 407 and 413 responsive to the $Q_3$ control pulse. Since the $Q_1$ control pulse is not present at arithmetic logic unit 409 during the $Q_3$ control pulse interval, the arithmetic logic unit is operative to transfer the $14\beta^2$ signal from register 407 to the negative input of subtractor 411. Subtractor 411 forms the difference between the $Y_{10}=15$ signal in register 307 and the $14\beta^2$ predictor correction signal from arithmetic logic unit 409. The resultant difference signal $Y_{10}'=1$ is inserted into register 307 responsive to the $Q_4$ control pulse applied via OR-gate 305.

The $Y_9'=-4$ from register 309 and the $Y_8{}^c=6$ signal from register 311 are applied to subtractor 350 prior to the beginning of the $Q_6$ control pulse in the $m=9$ signal period and the absolute value of the difference $Y_9'-Y_8$ is compared to the $F_1=10$ feature signal from demultiplexor 301. Since the output of absolute value former circuit 352 is not greater than the $F_1$ feature signal, register 357 is not set by the $Q_6$ control pulse and signal $C_1$ remains disabled. Responsive to the disabled $C_1$ signal, selector 343 is operative to transfer the $Y_9'=-4$ signal from register 309 as signal $R_9$ to the input of register 311 and to the $R_n$ input of subtractor 401.

The zero output of subtractor 401 is placed in register 403 responsive to the $Q_7$ control pulse and this zero signal is transferred to register 407 via multiplier 405 responsive to the $Q_8$ control pulse applied via OR-gate 428. During the $Q_7$ control pulse interval, the $R_9=-4$ signal is applied to D to A converter 345 and the sampled output therefrom is passed through low-pass filter 347 to form the part of waveform 605 at time $t_9$ shown in FIG. 6. As readily seen from FIG. 6, the $-4$ value at $t_9$ is substantially closer to the original signal of waveform 601 than the signal at the output of decoder 303 at time $t_9$ shown in waveform 603.

Just prior to the $Q_9$ control pulse of the $m=9$ signal period, the output of subtractor 411 in FIG. 4 is the difference between the $Y_{10}'=1$ signal from register 307 and the zero signal from register 409. This $Y_{10}'=1$ signal is placed in register 307 by the $Q_9$ control pulse. In the $Q_1$ control signal interval of the $m=10$ signal period, the $Y_8{}^c=6$ signal from register 311 is transferred to register 313. The $Y_9'=-4$ signal is transferred from register 309 via selector 343 to register 311. The $Y_{10}'=1$ signal from register 307 is transferred to register 309 and the $Y_{11}=19$ signal shown in the $Y_n$ column of table 1 is transferred from the output of decoder 303 to register 307. Responsive to the $Q_2$ control signal, the zero output of register 407 is added to the $14\beta^2$ signal from register 413 in arithmetic logic unit 409. The output of arithmetic logic unit 409 is inserted into register 415 responsive to the $Q_2$ control signal and the just entered signal from register 415 is multiplied by the $\beta$ constant in multiplier 405.

Responsive to the $Q_3$ control signal, the output of multiplier 405 ($14\beta^3$) is inserted into registers 407 and 413. At the beginning of the $Q_4$ control signal interval, arithmetic logic unit 409 transfers the output of register 407 to the negative input of subtractor 412 and the signal $Y_{11}'=19-14\beta^3=5$ is placed in register 307. In this manner, the $Y_{11}$ signal from decoder 303 is corrected for the error detected in the $m=9$ signal period.

Since the difference between the $Y_{10}'=1$ signal in register 309 and the $Y_9{}^c=-4$ signal in register 311 is less than 10, comparator 354 does not enable register 357 in the $Q_6$ control signal interval of the $m=11$ signal period. Therefore, the $R_{10}$ output from selector 343 corresponds to the $Y_{10}'=1$ signal in register 309. Subtractor 401 in FIG. 4 produces a zero error signal which is transferred from register 403 to register 407 via multiplier 405. In the $Q_9$ control signal interval of the $m=10$ signal period, the output of register 407 is zero, and the contents of register 307 remain unaltered. Thus, during the $m=10$ signal period there is no modification of the $Y_{10}$ signal. The $Y_{11}$ signal in register 307, however, is altered to correct for the detected error of the $m=8$ signal period in predictor 306 as in equation 9.

During the $m=11$ signal period the $Y_9{}^c=-4$ signal is placed in register 313, the $Y_{10}{}^c=1$ signal is placed in register 311, the $Y_{11}'=5$ signal from register 307 is placed in register 309, and the $Y_{12}=11$ signal from decoder 303 is placed in register 307. As previously described with respect to the $m=10$ signal period, the $Y_{12}$ signal is modified by subtracting the previously detected error signal therefrom and the resultant $Y_{12}'=-3$ signal is placed in register 307. Since the difference between the $Y_{11}'=5$ and the $Y_{10}'=1$ signal is less than feature signal $F_1$ there is no modification of the $Y_{11}'$ signal in register 309 and $R_{11}$ is equal to 5. In similar manner during the $m=12$ signal period, the $Y_{13}=14$ signal is decremented to zero to correct for the previous error of the $m=9$ signal period according to equation 9. The $R_{12}=-3$ signal of the $m=12$ signal period is obtained from register 309.

The output of decoder 303 in the $m=13$ signal period is the result of interference on transmission channel 220. The corrupted $Y_{14}=25$ signal is decremented to $Y_{14}'=11$ during the $Q_4$ control signal interval. The $C_1$ signal from register 357 remains disabled during and after the $Q_6$ control signal interval. This is so because the absolute value of the difference between the $Y_{13}'=0$ signal in register 309 and the $Y_{12}=-3$ signal in register 311 is less than feature signal $F_1=10$.

Selector 343 is operative, responsive to the disabled $C_1$ signal, to provide an $R_{13}=0$ signal to register 311, D to A converter 345, and subtractor 401. In the $Q_1$ control signal interval of the succeeding $m=14$ signal period, the $Y_{12}{}^c=-3$ signal is transferred from register 311 to register 313. The $Y_{13}{}^c=0$ is placed in register 311 as the $R_{13}$ signal. The $Y_{14}'=11$ signal is transferred from register 307 to register 309 and the $Y_{15}=29$ signal from decoder 303 is placed in register 307.

Responsive to the $Q_4$ control pulse, the $Y_{15}=29$ signal is decremented to $Y_{15}'=15$ signal in subtractor 411. The output of comparator 319 is high since $Y_{15}'=15$ from register 307 is greater than $Y_{14}'=11$ from register 309. Similarly the output of comparator 321 is high because $Y_{13}{}^c=0$ in register 311 is greater than $Y_{12}=-3$ signal in register 313. The high outputs of both comparators 319 and 321 enable AND-gate 323. NOR-gate 325 and exclusive OR-gate 327 remain disabled. Enabled signal $A_1$ permits the output of Adder 330 to be inserted into register 340 by the $Q_5$ control signal. Thus the sum of $Y_{13}=0$ signal from register 311 and the $F_2=6$ feature signal from demultiplexor 301 is applied to the input of selector 343. The output of comparator 354 is enabled just prior to the beginning of the $Q_6$ control signal interval since the difference between signal $Y_{14}'=11$ and signal $Y_{13}{}^c=0$ is greater than the $F_1=10$ feature signal. Signal $C_1$ is enabled and signal $R_{14}$ becomes 6.

In the $Q_7$ signal interval of the $m=14$ signal period, subtractor 401 of FIG. 4 generates a $Y_{14}'=5$ signal which is placed in register 403. This signal is multiplied by the leakage factor $\beta$ in multiplier 405 and inserted into register 407 responsive to the $Q_8$ control signal. In the $Q_9$ control signal interval, the $Y_{15}'=15$ signal from register 307 is applied to one input of subtractor 411. The $5\beta$ signal from register 407 is subtracted from the $Y_{15}'=15$ signal from register 307 and the resultant 10 signal is placed in register 307.

Responsive to the $Q_1$ control signal at the beginning of the $m=15$ signal period, the $Y_{13}{}^c=0$ signal in register 311 is transferred to register 313. The $R_{14}=6$ signal at the output of selector 343 is inserted into register 311. The $Y_{15}'=10$ signal from register 307 is inserted into register 309 and the $Y_{16}=30$ signal at the output of decoder 303 is placed in register 307.

During the $Q_1$ control signal interval, the $14\beta^7$ signal in register 413 is added to the $5\beta$ signal from register 407 in arithmetic logic unit 409 and the resultant sum is placed in register 415. The $14\beta^7+5\beta=19$ signal in register 415 is multiplied by $\beta$ in multiplier 405 and the resultant is placed in registers 407 and 413. The output of register 407 is subtracted from the $Y_{16}=30$ signal from register 307 in subtractor 411 and the resultant difference signal $Y_{16}'=11$ is placed in register 307 responsive to the $Q_4$ control signal.

In the $Q_5$ control signal interval of the $m=15$ signal period, the $Y_{14}{}^c=6$ signal from register 311 is subtracted from the $Y_{15}=10$ signal output of register 309 in subtractor 350. The absolute value of the difference signal from subtractor 350 (4) is less than the $F_1=10$ feature signal stored in multiplexor 301. Consequently, register 357 provides a disabled $C_1$ signal at the beginning of the $Q_6$ control period. The $R_{15}=10$ signal is then obtained from register 309 in the $Q_7$ control signal period.

Since $Y_{15}'=R_{15}$, subtractor 401 inserts a zero signal into register 403 which zero signal is transferred to register 407 and the $Y_{16}'=11$ signal in register 307 remains unchanged in the $Q_9$ control signal period. As is readily seen in FIG. 6, the error introduced in the transmission of the signal of waveform 601 at time $t_{14}$ shown in waveform 603 is fully corrected in waveform 605 which represents the output of the circuit of FIGS. 3 and 4. The error reduction obtained in the circuits of FIGS. 2, 3, and 4 results in a substantial improvement of the intelligibility and the perceptual acceptability of the replicas of the output signal to the transmitter of FIG. 2.

While the invention has been described with respect to a particular illustrative embodiments, it is to be understood that various modifications in form and detail may be made by those skilled in the art without departing from the spirit and scope of the invention. For example, the error reduction arrangements of the invention may be applied to delta modulation or other pulse code modulation digital transmission systems as well as to adaptive pulse modulation arrangements. Additionally, the feature signals for detection and correction of corrupted signal samples may comprise features other than maximum and RMS deviation signals, and the logic circuit arrangements of the described embodiments may be replaced by other digital processing apparatus such as microprocessors equipped with permanently stored instruction codes.

We claim:

1. An error reduction arrangement in a communication system comprising transmitting means including means for receiving an input signal, means for converting said input signal into blocks of coded signals, and means for applying said blocks of coded signals to a transmission medium; and receiving means for converting the coded signal blocks from said transmission medium into a replica of said input signal;

CHARACTERIZED IN THAT said transmitting means (180) further comprises feature signal generating means (110,112) responsive to said blocks of coded signals for generating a signal representative of a first set of features of the waveform of said input signal and a signal corresponding to a second set of features of the waveform of said input signal; and said receiving means (190) further comprises means (153, 157) jointly responsive to the received first waveform feature signal and the received block coded signals for detecting corrupted received coded signals; and means (160) operative upon detection of each received corrupted coded signal jointly responsive to said received second waveform feature signal and the received block coded signals for modifying the value of said corrupted coded signal to reduce errors in said signal replica.

2. An error reduction arrangement in a communication system according to claim 1 further CHARACTERIZED IN THAT said feature signal generating means comprises first waveform feature signal generating means for combining the coded signals of each block to form a signal representative of a first distinct feature of the block portion of the waveform of said input signal, and second waveform feature signal generating means for combining the coded signals of said block to form a signal corresponding to a second distinct feature of the waveform of the input signal block portion.

3. An error reduction arrangement in a communication system according to claim 2 further CHARACTERIZED IN THAT said detecting means comprises means jointly responsive to the coded signals of each received block and the received first distinct waveform feature signal of said block portion for detecting the occurrence of each corrupted received coded signal of said block and said modifying means comprises means jointly responsive to the coded signals of said received block and the second distinct waveform feature signal of said received block portion for altering each corrupted coded signal.

4. An error reduction arrangement in a communication system according to claim 3 further CHARACTERIZED IN THAT said block corrupted signal occurrence detecting means comprises means for combining the received block coded signals, and means for comparing said combined received block coded signals with said received block first distinct waveform feature signal; and said modifying means comprises means jointly responsive to said received block coded signals and said received block second distinct waveform feature signal for forming a third signal, and means for substituting said third signal for the detected corrupted coded signal.

5. An error reduction arrangement in a communication system according to claim 4 wherein said means for forming said third signal comprises means for combining said received block second distinct waveform feature signal with the received coded signal immediately preceding said detected corrupted coded signal, and said substituting means comprises means for replacing said detected corrupted signal by the output of said means for combining the received block second distinct waveform feature signal with the received coded signal immediately preceding the detected corrupted signal.

6. An error reduction arrangement in a communication system according to claim 5 further CHARACTERIZED IN THAT said first distinct waveform feature signal generating means comprises means for dividing said block coded signals into groups, means for producing a signal characteristic of the waveform of each of said groups, and means for selecting one of said group characteristic signals as said first distinct waveform feature signal, and said second distinct waveform feature signal forming means comprises means for partitioning said block coded signals into sets, means for producing a signal characteristic of the waveform of each partitioned set, and means for combining the partitioned set characteristic signals to generate said second distinct waveform feature signal.

7. An error reduction arrangement in a communication system according to claim 6 further CHARACTERIZED IN THAT said block dividing means comprises means for dividing said block coded signals into a sequence of pairs of adjacent coded signals, said means for producing a signal characteristic of each of said groups comprises means for generating a signal representative of the deviation between adjacent coded signals, and said means for selecting one of said characteristic signals comprises means for selecting the maximum of said deviation signals.

8. An error reduction arrangement in a communication system according to claim 7 further CHARACTERIZED IN THAT said block partitioning means comprises means for partitioning said block coded signals into a sequence of adjacent coded signals, said means for producing a signal characteristic of each of said sets comprises means for generating a signal representative of the deviation between the adjacent coded signals, and said means for combining said characteristic signals comprises means responsive to said block deviation signals for forming a signal representative of the RMS value of said deviation signals.

9. An error reduction arrangement in a communication system according to claim 8 wherein said input signal in a speech signal and each block of coded signals represents successive samples of said speech signal further CHARACTERIZED IN THAT said group signal characteristic producing means comprises means for producing a signal representative of the deviation between adjacent samples of said input speech signal; and said maximum deviation signal selecting means comprises means for generating a signal representative of the maximum deviation between adjacent samples of said input speech signal.

10. An error reduction arrangement in a communication system according to claim 9 further CHARACTERIZED IN THAT said set characteristic signal generating means comprises means for producing a signal representative of the deviation between adjacent samples of said input speech signal; and said characteristic signal combining means comprises means for forming a signal representative of the RMS value of said speech signal adjacent sample deviations in said block.

11. An error reduction arrangement in a communication system according to claim 8 or claim 10 further CHARACTERIZED IN THAT the combining means of said block corrupted signal detecting means comprises means for forming a signal representative of the difference between each pair of received adjacent coded signals and said comprising means of said block corrupted signal detecting means comprises means responsive to said adjacent coded signal difference being greater than said selected maximum deviation representative signal for producing a fourth signal corresponding to the occurrence of a corrupted received coded signal.

12. An error reduction arrangement in a communication system according to claim 11 further CHARACTERIZED IN THAT said means for combining the received block deviation RMS signal with the received coded signal immediately preceding the detected corrupted received signal comprises means for storing each received coded signal, said immediately preceding received coded signal, the next preceding received coded signal, and the received coded signal immediately succeeding said received coded signal; first means for adding said deviation RMS value signal to said immediately preceding coded signal, second means for subtracting said deviation RMS value signal from said immediately preceding coded signal, and third means for applying said immediately preceding coded signal, and said substituting means comprises means jointly responsive to said fourth signal, said detected corrupted received signal, said stored immediately succeeding received coded signal, said stored immediately preceding coded signal and said stored next preceding coded signal for selecting one of said first, second and third means output signals to replace said detected corrupted received signal.

13. An error reduction arrangement in a differential pulse code modulation communication system comprising transmitting means including means for receiving an input analog signal, means responsive to said analog signal for producing successive blocks of first coded sample signals, means for converting each block of first coded sample signals into a block of differential pulse code modulation coded signals and means for applying said differential pulse code modulation coded signals to a communication channel; and receiving means comprising means for converting each block of differential pulse code modulation coded signals into a block of second coded sample signals, and means responsive to the blocks of second coded sample signals for generating a replica of said analog signal

CHARACTERIZED IN THAT said transmitting means further comprises feature signal generating means responsive to the blocks of differential pulse code modulation coded signals for generating a signal representative of a set of first features of the waveform of the analog signal and a signal corresponding to a set of second features of the waveform of said analog signal, and means for applying the sets of first and second waveform feature signals to said communication channel; and said receiving means further comprises means jointly responsive to said received first waveform feature signal and the blocks of second coded sample signals for detecting erroneous second coded sample signals, and means operative upon detection of each erroneous second coded sample signal jointly responsive to the received second waveform feature signal and the second coded sample signals for modifying the value of said detected erroneous second coded sample signal to reduce errors in said analog signal replica.

14. An error reduction arrangement in a differential pulse code communication system according to claim 13 further CHARACTERIZED IN THAT said feature signal generating means comprises means responsive to each block of differential pulse coded modulation coded signals for producing a set of third coded sample signals, means responsive to the third coded sample signals of each block for forming a signal representative of a first distinct feature of the block portion of the waveform of the input analog signal, and means for combining the third coded sample signals of said block to form a signal corresponding to a second distinct feature of the waveform of the input analog signal block portion.

15. An error reduction arrangement in a differential pulse code modulation system according to claim 14 further CHARACTERIZED IN THAT said detecting means comprises means jointly responsive to the second coded sample signals of each received block and the received first distinct waveform feature signal of said block portion for detecting the occurrence of erroneous received second coded sample signals of said block; and said modifying means comprises means jointly responsive to the second coded sample signals of said received block and the second distinct waveform feature signal of said received block for altering said erroneous second coded sample signal.

16. An error reduction arrangement in a differential pulse code modulation communication system according to claim 15 further CHARACTERIZED IN THAT said block erroneous signal occurrence detecting means comprises means for combining the received block second coded sample signals, and means for comparing the combined received block second coded sample signals with the received block first distinct waveform feature signal, and said modifying means comprises means jointly responsive to the received block second coded sample signals and the received block second distinct waveform feature signal for forming a third signal, and means for substituting said third signal for the detected erroneous second coded sample signal.

17. An error reduction arrangement in a differential pulse code modulation communication system according to claim 16 wherein said means for forming said third signal comprises means for combining the received block second distinct waveform feature signal with the second coded sample signal immediately preceding the detected erroneous second coded sample signal; and said substituting means comprises means for replacing the detected erroneous second coded sample signal by said combined received block second distinct waveform feature signal and second coded sample signal immediately preceding said detected erroneous second coded sample signal.

18. An error reduction arrangement in a differential pulse code modulation communication system according to claim 17 further CHARACTERIZED IN THAT said first distinct waveform feature signal generating means comprises means for dividing the block first coded sample signals into groups, means for producing a signal characteristic of each of said groups, and means for selecting one of said group characteristic signals as the first distinct waveform feature signal; and the second distinct waveform feature signal forming means comprises means for partitioning the block first coded sample signals into sets, means for producing a signal characteristic of each partitioned set, and means for combining the partitioned set characteristic signals to generate said second distinct waveform feature signal.

19. An error reduction arrangement in a differential pulse code modulation communication system according to claim 18 further CHARACTERIZED IN THAT said block dividing means comprises means for dividing the block first coded sample signals into a sequence of adjacent first coded sample signals, said means for producing a signal characteristic of each of said groups comprises means for generating a signal representative of the deviation between the adjacent first coded sample signals; and said means for selecting one of said characteristic signals comprises means for selecting the maximum of the deviation signals of the block.

20. An error reduction arrangement in a differential pulse code modulation communication system according to claim 19 further CHARACTERIZED IN THAT said block partitioning means comprises means for partitioning the block first coded sample signals into a sequence of adjacent first coded sample signals, said means for producing a signal characteristic of each of said sets comprises means for generating a signal representative of the deviation between the adjacent first coded sample signals; and said means for combining the characteristic signals comprises means responsive to the block deviation signals for forming a signal representative of the RMS value of said block deviation signals.

21. An error reduction arrangement in a differential pulse code modulation communication system according to claim 20 further CHARACTERIZED IN THAT said means for combining the received block second coded sample signals comprises means for forming a signal representative of the difference between the adjacent second coded sample signals and said means for comparing the combined second coded sample signals with the received block first distinct waveform feature signal comprises means responsive to said adjacent second coded sample signal difference being greater than said first distinct waveform feature signal for producing a fourth signal corresponding to the occurrence of an erroneous second coded sample signal.

22. An error reduction arrangement in a differential pulse code modulation communication system according to claim 21 further CHARACTERIZED IN THAT said means for combining said RMS deviation signal with the coded second sample signal immediately preceding said detected erroneous coded second sample signal comprises means for storing each coded second sample signal, the immediately preceding coded second sample signal, the next preceding coded second sample signal, and the coded second sample signal immediately succeeding said received coded second sample signal; means reponsive to each received coded second sample signal for generating a fifth signal corresponding to the sum of said immediately preceding coded second sample signal and said RMS deviation signal and a sixth signal corresponding to the difference between said immediately preceding coded second sample signal and said RMS deviation signal; and means responsive to said fourth signal, said stored received coded second sample signal, said stored immediately preceding coded second sample signal, the stored next preceding coded second sample signal, and said stored immediately succeeding coded second sample signal for selecting one of said fifth, sixth, and immediately preceding second coded sample signals to replace said detected erroneous coded second sample signal.

23. A method for reducing errors in a communication system comprising a transmitter including means for receiving an input signal, means for converting said input signal into blocks of coded signals, and means for applying said blocks of coded signals to a transmission medium; and a receiver for converting the coded blocks of signals from said transmission medium into a replica of said input signal; said method being CHARACTERIZED IN THAT: in the transmitter, a signal representative of a first set of features of the waveform of said input signal and a signal representative of a second set of features of the waveform of said input signal are generated responsive to said blocks of coded signals, and said first and second waveform feature signals are applied to said transmission medium; in said receiver, corrupted received coded signals are detected responsive to said first waveform feature signal and said received blocks of coded signals; and, jointly responsive to said second waveform feature signal and the received blocks of coded signals upon detection of a corrupted received coded signal, the value of the corrupted received coded signal is modified to reduce errors in said input signal replica.

24. A method for reducing transmission errors in a communication system according to claim 23 further CHARACTERIZED IN THAT the feature signal generation in said transmitter comprises the steps of combining the coded signals of each block to form a signal representative of a first distinct waveform feature of the block portion of input signal, and combining the coded signals of said block to form a signal corresponding to a second distinct waveform feature of the input signal block portion.

25. A method for reducing transmission errors in a communication system according to claim 24 further CHARACTERIZED IN THAT said corrupted coded signal detection in said receiver comprises the step of detecting received corrupted coded signals of said block jointly responsive to the coded signals of each block and the received first distinct waveform feature signal of said block portion; and said modifying step in said receiver comprises the step of altering said received corrupted coded signal responsive to the coded signals of said received block and the second distinct waveform feature signal of the received block portion.

26. A method for reducing transmission errors in a communication system according to claim 25 further CHARACTERIZED IN THAT said received block corrupted coded signal detecting step comprises the step of combining the received block coded signals, and comparing the combined received block coded signals with the block first distinct waveform feature signal; and said altering step comprises the steps of forming a third signal jointly responsive to the received block coded signals and the received block second distinct waveform feature signal, and substituting said third signal for the detected received corrupted coded signal.

27. A method for reducing transmission errors in a communication system according to claim 26 further CHARACTERIZED IN THAT said third signal forming step comprises combining the received block second distinct waveform feature signal with the received coded signal immediately preceding the detected received corrupted coded signal, and said substituting step comprises replacing the detected received corrupted coded signal by the combined immediately preceding received coded signal and received second distinct waveform feature signal.

28. A method for reducing transmission errors in a communication system according to claim 27 further CHARACTERIZED IN THAT said first distinct waveform feature signal forming step comprises dividing the block coded signals into groups, producing a signal characteristic of each of said groups, and selecting one of said group characteristic signals as the first distinct waveform feature signal; and said second distinct waveform signal forming step comprises partitioning the block coded signals into sets, producing a signal characteristic of each partitioned set and means for combining the partitioned set characteristic signals to produce said second distinct waveform feature signal.

29. A method for reducing transmission errors in a communication system according to claim 28 further CHARACTERIZED IN THAT
said block partitioning step comprises partitioning said block coded signals into a sequence of adjacent coded signals, said step of producing a signal characteristic of said sets comprises generating a signal representative of the deviation between adjacent coded signals, and the characteristic signal combining step comprises forming a signal representative of the RMS value of said deviation signals.

30. A method for reducing transmission errors in a communication system according to claim 29 further CHARACTERIZED IN THAT
said block dividing step comprises dividing said block coded signals into a sequence of adjacent coded signals, said characteristic signal producing step comprises generating a signal representative of the deviation between adjacent coded signals, and said selecting step comprises selecting the maximum of said deviation signals.

31. A method for reducing transmission errors in a communication system according to claim 30 further CHARACTERIZED IN THAT
the combining of block coded signals in the corrupted signal detection step comprises forming a signal representative of the difference between the received adjacent coded signals, and the comparing step of the corrupted signal detection comprises producing a fourth signal corresponding to the occurrence of a corrupted received coded signal responsive to the received adjacent coded signal difference being greater than the received selected maximum deviation signal of the block.

32. A method for reducing transmission errors in a communication system according to claim 31 further CHARACTERIZED IN THAT
said step of combining the received RMS deviation signal with the received coded signal immediately preceding the received corrupted coded signal includes temporarily storing each received coded signal, the immediately preceding received coded signal, the next preceding received coded signal, and the received coded signal immediately succeeding said received coded signal; generating a fifth signal corresponding to the sum of said immediately preceding received signal and said RMS deviation signal responsive for each received coded signal; generating a sixth signal corresponding to the difference between said immediately preceding received signal and said RMS deviation signal for each received coded signal; and, responsive to said fourth signal, said stored received coded signal, said stored immediately preceding received coded signal, said stored next preceding received coded signal and said stored immediately succeeding received coded signal, selecting one of said fifth, sixth and immediately preceding received coded signal to replace the detected received corrupted coded signal.

33. A method for reducing transmission errors in a communication system according to claim 23 or claim 32 wherein said input signal is an analog signal.

34. A method for reducing transmission errors in a communication system according to claim 33 wherein said analog signal is a speech signal.

* * * * *